United States Patent
Mizrahi

(10) Patent No.: US 8,834,806 B2
(45) Date of Patent: Sep. 16, 2014

(54) CRYSTALLIZATION APPARATUS

(76) Inventors: Yosef Mizrahi, Haifa Bay (IL); Tamar Ziv, legal representative, Haifa (IL)

( * ) Notice: Subject to any disclaimer, the term of this patent is extended or adjusted under 35 U.S.C. 154(b) by 0 days.

(21) Appl. No.: 13/434,112

(22) Filed: Mar. 29, 2012

(65) Prior Publication Data
US 2014/0147367 A1    May 29, 2014

(51) Int. Cl.
*B01D 9/02*    (2006.01)
(52) U.S. Cl.
USPC ........................................ 422/254; 23/302 R
(58) Field of Classification Search
USPC .............. 23/302 R; 422/254, 245.1, 252, 253
See application file for complete search history.

(56) References Cited

U.S. PATENT DOCUMENTS 8,231,792 B2 *   7/2012   Fiene et al. ................... 210/714

* cited by examiner

*Primary Examiner* — Edward Johnson

(57) ABSTRACT

A reaction-crystallization apparatus for carrying out reaction and/or solvent extraction and/or crystallization of soluble salts has an upper section having a top and a decanter. The decanter has a vertical vessel having a horizontal weir at the top of the upper section. The top of the upper section has an outlet for removing a light phase at the top of the decanter. The apparatus has a lower section, including a crystallizer. The crystallizer includes: a coaxial draft tube; a feed pipe; an agitator inside the draft tube; and at least one outlet at the bottom for crystal slurry removal. The apparatus has an intermediate section sandwiched between the lower section and the upper section such that the sections are in fluid communication and includes at least one coaxial vertical baffle with a gap between the draft tube and the coaxial vertical baffle and is adjustable by moving the baffle.

3 Claims, 1 Drawing Sheet

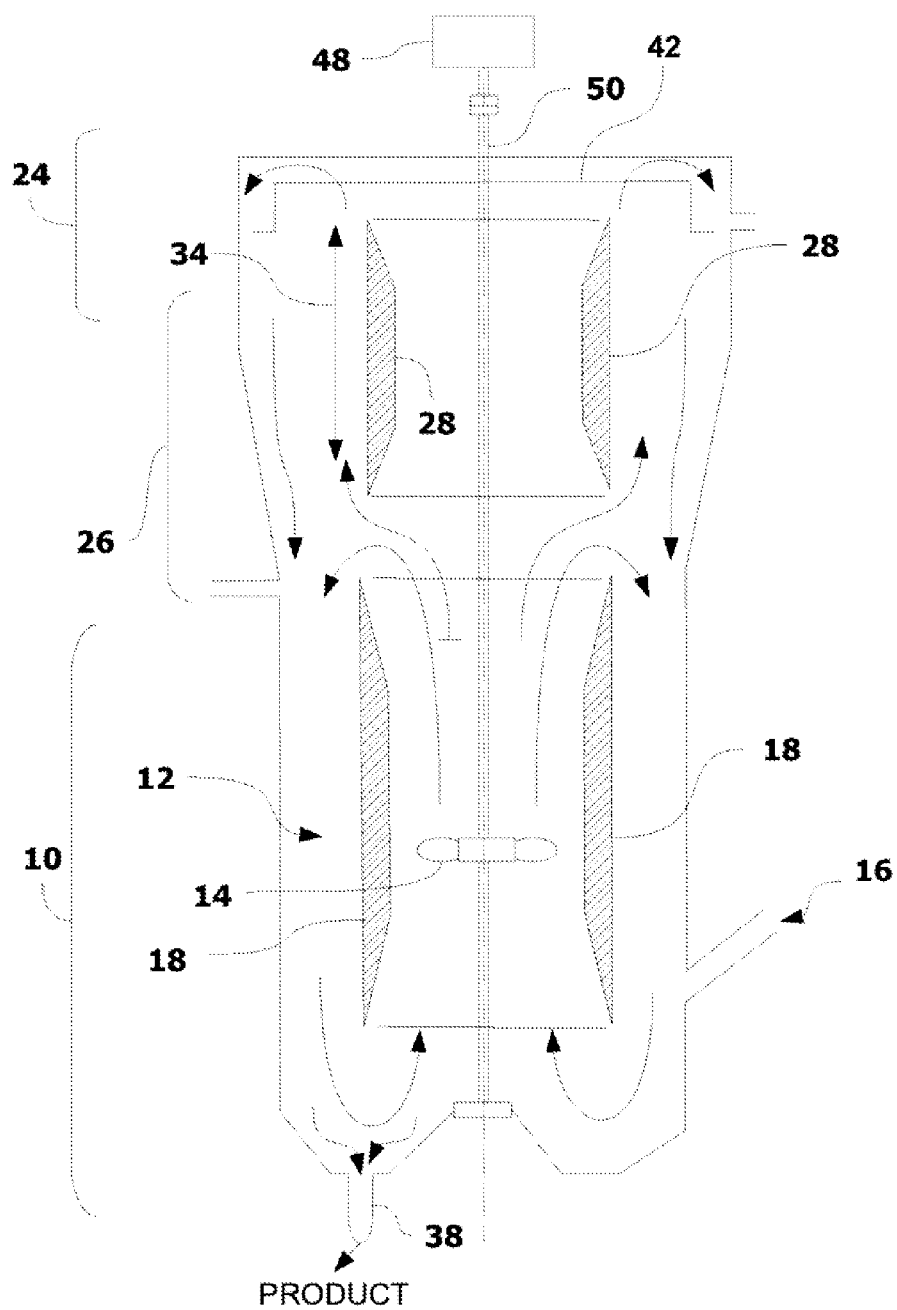

CRYSTALLIZATION APPARATUS

CROSS REFERENCE TO RELATED APPLICATIONS

This application claims priority from patent application GB 1105421.0, entitled "CRYSTALLIZATION APPARATUS", filed on Mar. 31, 2011, the contents of which are incorporated herein by reference.

FIELD OF THE INVENTION

The present invention relates to a multi-function chemical reactor, in particular, the present invention is about a three phase crystallization unit for providing highly uniform crystals.

BACKGROUND OF THE INVENTION

Description of Prior Art

Methods and apparatus for crystallization of salts from solution are well known in the chemical process industry and have been the subject of several patents. Bennett et al. in U.S. Pat. No. 3,873,275 and in U.S. Pat. No. 3,961,904 describe several crystallizer configurations, each implementing a draft tube baffled agitated vessel (DTB) for improving the crystal size. The DTB crystallizer invented by Bennett et al has been implemented commercially at numerous industrial plants for the controlled crystallization of several salts. This DTB crystallizer forms essentially a two phase system, a liquid phase, a saturated solution and a solid phase, being the crystals.

Methods for production of a salt (referred to as MY) and an acid (referred to as HX) from a salt (referred to as MX) and an acid (referred to as HY) in a double decomposition reaction I (see below), were disclosed. More particularly the production of potassium nitrate from KCl and Nitric acid, by solvent extraction has been applied at several production plants and has been disclosed in several disclosures: U.S. Pat. No. 2,894,813 by Baniel et al.; U.S. Pat. No. 4,364,914 and U.S. Pat. No. 4,378,342 by Manor et al.; and U.S. Pat. No. 4,668,495 by Portela et al. In generalized terms, the reactions taking place in such production plants is as follows:

MX+HY→MY+HX

HX+solvent→solvent.HX

In the prior art, reactions (I) and (II) are carried out in one to several agitated vessels in series. The reactants are mixed with a solvent and some recycled aqueous solution, producing a three-phase stream that is fed to a decanter for separation of the loaded solvent; the mother liquor; and the product. The hydrodynamic regime at these agitated vessels are poorly defined and controlled far from the classical hydrodynamic conditions required for appropriate crystallization, consequently the product crystals are small and badly defined.

A method for crystallization according to which cooling of a saturated solution is carried out directly by employing a volatile liquid was described in U.S. Pat. No. 4,452,621 by Patrick et al.

SUMMARY OF THE INVENTION

A reaction-crystallization apparatus for carrying out reaction and/or solvent extraction and/or crystallization of soluble salts has an upper section having a top and a decanter. The decanter has a vertical vessel having a horizontal weir at the top of the upper section. The top of the upper section has an outlet for removing a light phase at the top of the decanter. The apparatus has a lower section, including a crystallizer. The crystallizer includes: a coaxial draft tube; a feed pipe; an agitator inside the draft tube; and at least one outlet at the bottom for crystal slurry removal. The apparatus has an intermediate section sandwiched between the lower section and the upper section such that the sections are in fluid communication and includes at least one coaxial vertical baffle with a gap between the draft tube and the coaxial vertical baffle and is adjustable by moving the baffle.

Other features and advantages of the instant invention will become apparent from the following description of the invention which refers to the accompanying drawings.

BRIEF DESCRIPTION OF THE DRAWINGS

FIG. 1 is a schematic cross sectional view of a crystallization apparatus of the invention.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

In accordance with the present invention, a method and apparatus for crystallization of a salt from a three phase system featuring a combination of an aqueous phase, a solvent phase and solid phase, crystals. The system of the present invention employs and integrates the DTB crystallizer method invented by Bennett et al. referenced above, into a new and unique apparatus for simultaneously carrying out: reaction; crystallization; solvent extraction, decantation and direct heat transfer.

The present invention relates to a novel apparatus which features a unique combination of the classic DTB crystallizer and a three phase decanter enabling to perform solvent extraction reaction for the production of large, well defined crystals. The apparatus in accordance with the invention implements a unitary crystallizer design for carrying out, simultaneously, the following unit operations:

A double decomposition reaction (I) MX and MY being salts, HX and HY being acids.

Solvent extraction of the acid HX produced in reaction (I) by and partially immiscible organic solvent, (II)

Dissolution of the reactant, MX, and crystallization of the product, MY, at hydrodynamic conditions of a classical draft tube baffled (DTB) crystallizer, to produce crystals having D50 typically in the range of 350 to 550 microns.

Removal of heat of reaction and or heat of crystallization by the solvent mentioned in (3) thereby applying direct cooling crystallization (DCC) principles.

Decantation and separation of the Liquid-Liquid-Solid producing at least three separate outlet streams: loaded solvent, mother liquor, and slurry of the product crystals.

The present invention relates to a novel apparatus and method for simultaneously carrying out: reaction; crystallization; solvent extraction; decantation and direct cooling. The apparatus, depicted in FIG. 1, features three distinct sections having different functions and flow regimes:

Lower section 10, a crystallizer, which includes a draft tube (DT) 12, a coaxially revolving propeller 14; several feed pipes 16, and a cylindrical baffle (CB) 18. It features a flow regime similar to a conventional DTB crystallizer.

Upper section 24 which includes a decanter, featuring a flow regime similar to a conventional decanter. It has a larger diameter than lower section, and it is designed to accomplish gravity decantation for separating the light organic phase from the aqueous and crystals phases.

An intermediate, transition section 26, matches the two different flow regimes. It includes a coaxial vertical baffle (CVB) 28 the role of which is to reduce drastically the flow disturbance coming from below, and subsequently its affect on the gravitational flow regime of the decanter, while at the same time it enables bi-directional flow between the two sections. The gap between the CVB 28 and the top of the DTB may be adjusted. The flow between the upper and the lower section is controlled by the CVB 28. The CVB splits the DT discharge flow into two streams: a first one downwards back to the DT section, and the second one upwards, to the decanter. The split ratio is controlled by changing the gap between CVB 28 and the top of DT 12. This gap is adjusted by moving the CVB up and down accordingly, as shown by double headed arrow 34.

The lower section has a hydrodynamic regime similar to the conventional DTB crystallizer. The reactants are fed through feed pipes 16 preferably but not limited to, the bottom of the DT 12. One or more feed pipes used for every reactant: —the solvent; the acid, HX, slurry of salt MX, and any recycled stream, like mother liquor are fed to the DT 12. The mixture: crystals, mother liquor and solvent, are circulated upwards trough the DT 12. The geometry of this section is dictated by well-established DTB crystallizer design considerations, for fluidizing the crystals maintaining a low super-saturation condition avoiding secondary nucleation.

Additionally, according to method of the present invention, the geometry of the lower section accomplishes the requirement of mixing the organic solvent at controlled hydrodynamic regime to achieve well defined, preferably o/w (oil in water) dispersion, not limited to, taking in consideration and optimizing mass transfer and fast and complete phase disengagement requirements.

The slurry with the coarse crystals is discharged through an outlet 38 at the bottom, while the brine with fine crystals is drawn up through the CB in the same way as in a conventional DTB crystallizer. The general arrangement however differs from a conventional decanter. The feed flows upwards, the separated heavy phases (brine and crystals) flow downwards. The separated light phase at the top the upper section is discharged over a conventional leveled overflow weir 42. The lean solvent is fed through one or several feed pipes such as feed pipe 16, at the lower section. It then circulates through the DT preferably as an o/w dispersion. A fraction of the dispersion, as controlled by CVB 28 flows up to the decanter. At the decanter the dispersion disengages producing a clear loaded solvent layer that floats above and over weir 42 at the top, while the aqueous phase and crystals subside by gravitation returning to the lower section. Motor 48 drives propeller 14 rotating axle 50. In other embodiments the motor can be located below the crystallizer, torque provided by an axle connecting the motor to the propeller.

The apparatus and the methods of the present invention may be used to improve the crystallization of a variety of solvent extraction-crystallization processes applications not limited to the above mentioned double decomposition reaction combined with solvent extraction of one of the products. The novel apparatus may be applied for implementing simultaneously all or some units operations (1) to (5) outlined above. The apparatus of the present invention may be applied for the direct cooling crystallization of a salt from a saturated solution using an partial immiscible solvent for heat removal, like, not limited to, crystallization of potassium nitrate from potassium nitrate rich solution by direct cooling crystallization with an inert, partially immiscible solvent like, not limited to, a high molecular paraffin. In a further aspect of the invention, the apparatus in accordance with the present invention may be applied for implementation of any reaction, combined with crystallization and solvent extraction using any partially immiscible solvent for driving the reaction-crystallization process. Examples of such solvents are paraffins, hydrocarbons, alcohols, ketones, ethers, esters, liquid cationic ion exchanger or liquid anionic ion exchanger or a mixture of them.

In accordance with the present invention various different internal baffles arrangement structural features are applicable, to accomplish the novel and unique method of this invention.

EXAMPLES OF ACTUAL PROCESSES

Example 1

Pilot scale fabrication was carried out using a reactor in constituting an embodiment of the present invention for the production of potassium nitrate. The process in accordance with the present invention was applied for carrying out reaction, solvent extraction, and crystallization of potassium nitrate, concurrently in the same reactor.

Potassium chloride, 60% nitric acid and lean solvent were fed to the DT. The crystallizer had a 650 mm diameter DT with a pitched turbine rotating at 160 RPM.

The crystallizer operated continuously at steady state for 24 hours, producing potassium nitrate crystals with D50 of 390 microns.

As a comparison, the crystals from a conventional serial mixed reactors operating at the same flow composition and temperature had a D50 of 280 microns.

Example 2

A reactor manufactured in accordance with the present invention, was applied on a industrial scale for the production of potassium nitrate. The process in accordance with the present invention was carried out for implementing a reaction, solvent extraction, and crystallization concurrently obtaining potassium nitrate. Potassium chloride, 60% nitric acid and lean solvent were fed to the DT. The crystallizer had a 1850 mm diameter DT with a pitched turbine rotating at 55 to 65 RPM.

The crystallizer was operated continuously at steady state for 24 hours producing potassium nitrate crystals with D50 of 450 microns.

Example 3

A reactor manufactured in accordance with the present invention, was applied on an industrial scale for cooling crystallization of potassium nitrate from a rich potassium nitrate brine. The brine, the heavy phase, was mixed in the reactor with a chilled solvent, the light phase, producing potassium nitrate crystals with D50 of 520 microns.

Although the instant invention has been described in relation to particular embodiments thereof, many other variations and modifications and other uses will become apparent to those skilled in the art.

What is claimed is:

1. A reaction-crystallization apparatus for carrying out reaction and/or solvent extraction and/or crystallization of soluble salts, said apparatus comprising:
   an upper section having a top and a decanter, said decanter comprising:
   a vertical vessel having a horizontal weir at the top of said upper section;
   an outlet at the top of said upper section for removing a light phase at the top of the decanter;
   a lower section, including a crystallizer, which includes:
   coaxial draft tube
   at least one feed pipe;
   an agitator located inside the said draft tube
   at least one outlet at the bottom for crystal slurry removal; and
   an intermediate section sandwiched between the lower section and the upper section such that the sections are in fluid communication, and which includes at least one coaxial vertical baffle, there being a gap between the draft tube and the coaxial vertical baffle, where in use, the gap adjustable by moving said vertical baffle up or down.

2. A process for producing crystals using the apparatus as in claim 1, wherein at least two liquid phases and at least one solid phase are mixed to form a mixture for carrying out: a reaction and a solvent extraction, to form at least one crystal phase, a heavy phase and a light phase, the process comprising:
   extracting a portion of the light phase from the mixture;
   discharging from the upper section at least a portion of the light phase, and
   discharging from the lower section, crystals formed in the apparatus; and a portion of said heavy phase.

3. A process as in claim 2, wherein heat of reaction, heat of crystallization, and heat of cooling is removed by the light phase, said process comprising:
   mixing at least two phases, one light and the other heavy; wherein the temperature of the light phase is lower than the temperature of said heavy phase;
   forming at least one solid crystal phase and two liquid phases;
   discharging a portion of the light phase is from the upper section, and
   discharging the crystals and a portion of said heavy phase are from lower section.

* * * * *